United States Patent
Nordling

[19]

[11] Patent Number: 6,055,591
[45] Date of Patent: Apr. 25, 2000

[54] MODEM INTERFACE UNIT

[75] Inventor: Karl Nordling, Raleigh, N.C.

[73] Assignee: Cirrus Logic, Inc., Fremont, Calif.

[21] Appl. No.: 09/206,666

[22] Filed: Dec. 7, 1998

Related U.S. Application Data

[62] Division of application No. 08/931,785, Sep. 16, 1997.

[51] Int. Cl.$^7$ ............................................. G06F 13/00
[52] U.S. Cl. ............................... 710/69; 710/29; 710/30; 710/31; 710/60; 710/62
[58] Field of Search ........................... 710/29–35, 58–74, 710/129–130, 419; 445/557; 713/310, 320; 360/75; 370/347, 343; 379/413; 455/419, 587

[56] References Cited

U.S. PATENT DOCUMENTS

| | | | |
|---|---|---|---|
| 5,161,184 | 11/1992 | Smith et al. | 319/413 |
| 5,167,024 | 11/1992 | Smith et al. | 360/75 |
| 5,606,560 | 2/1997 | Malek et al. | 370/347 |
| 5,724,413 | 3/1998 | Suffern et al. | 379/98 |
| 5,822,692 | 10/1998 | Krisham et al. | 455/419 |
| 5,903,765 | 5/1999 | White et al. | 713/310 |
| 5,909,488 | 6/1999 | Koizumi et al. | 379/373 |

*Primary Examiner*—Christopher B. Shin
*Attorney, Agent, or Firm*—Robert P. Sabath; Richard E. Bee; Peter T. Rutkowski

[57] ABSTRACT

A modem interface communicates data between a computer and a modem that is coupled to an external communication network. The modem interface includes a host interface for coupling to a host processor of the computer, an analog interface for coupling to the modem, and a digital signal processor for processing the data communicated with the modem and the host processor. A memory is coupled to the host interface, the digital signal processor and the analog interface. The analog interface provides clock signals and converts data between analog and digital for communicating between the memory and the modem. The analog interface provides an interrupt to the digital signal processor to control the transfer of data from the digital signal processor and the memory. The modem interface processes data at sampling rates while the host processor processes data at rates less than the sampling rate of the analog interface. communication between the modem interface and the host processor is driven by an interrupt provided from the host interface to the host processor which services the interrupt. The host processor clears the interrupt by writing to a register in the memory of the modem interface.

6 Claims, 10 Drawing Sheets

| MEMORY MAPPED REGISTERS | 302 |
|---|---|
| HOST INTERRUPT | 310 |
| DAC-0 | 312-1 |
| DAC-1 | 312-2 |
| ADC-0 | 314-1 |
| ADC-1 | 314-2 |
| SAMPLING RATE DIVISOR | 316 |
| DESCRETE I/O | 318 |
| PROGRAM COUNTER | 320 |
| STATUS | 322 |
| HOST INTERRUPT CLEAR | 324 |

*Fig. 3*

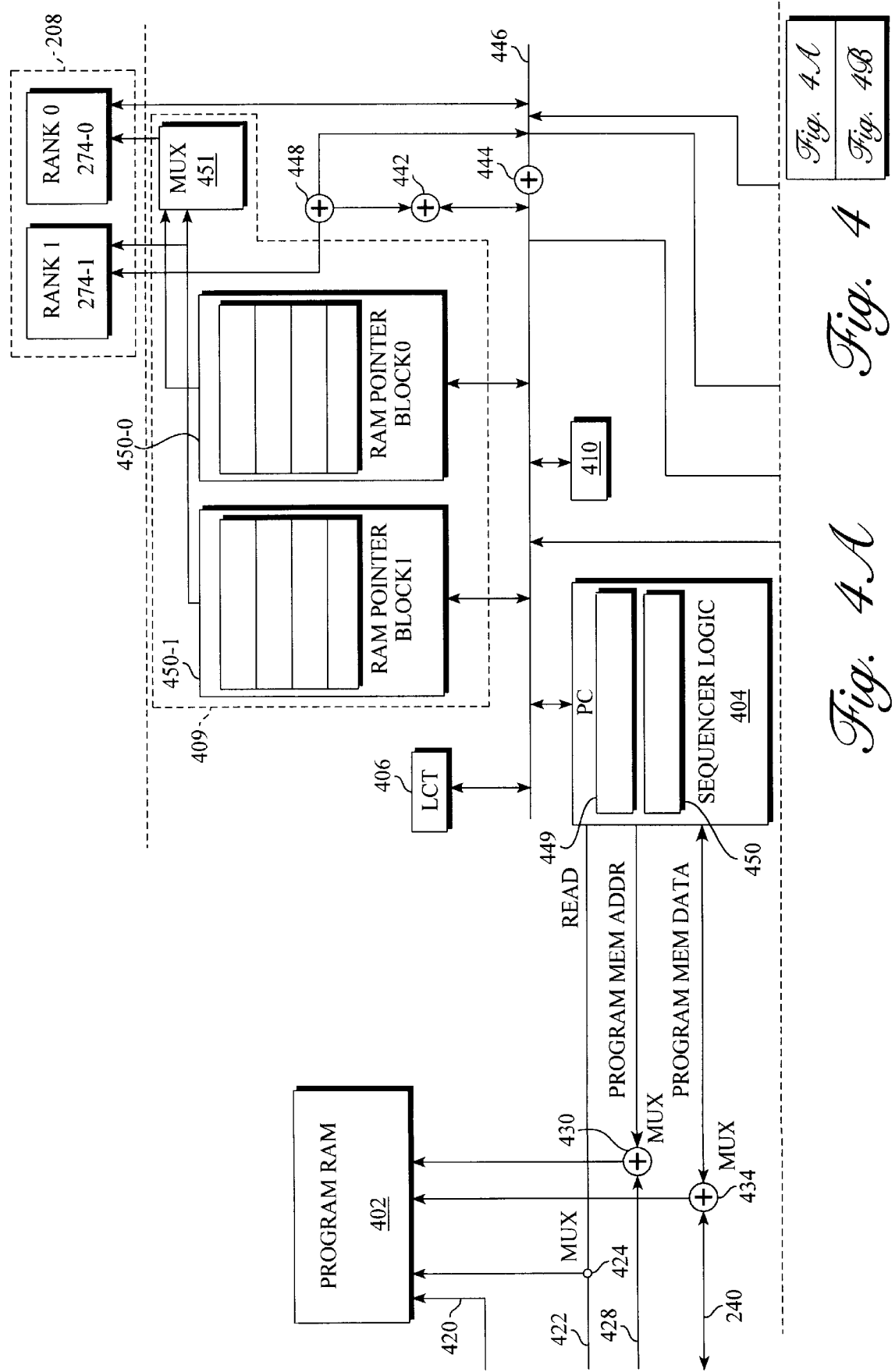

MODEM INTERFACE UNIT

This is a Divisional of application Ser. No. 08/931,785 filed on Sep. 16, 1997.

TECHNICAL FIELD

This invention relates to analog and digital signal processing, and more particularly, to a combined analog front end and digital signal processing integrated circuit.

BACKGROUND OF THE INVENTION

Digital signal processors provide pipeline processing of digital information. The digital information typically is provided by analog to digital converters that convert an analog signal, such as voice, into digital signals. Digital signal processors and analog to digital converters typically are designed separately and serially process data without regard to optimizing the data processing.

It is desired to have a combined analog front end and digital signal processing circuit that is designed to work with host processors such as a RISC processor.

SUMMARY OF THE INVENTION

The present invention provides a modem interface circuit that includes a memory, an analog interface and a digital signal processor. The memory is configured to be accessed by an external host processor. The analog interface communicates data with an external modem and converts analog data received from the external modem to digital data, and converts digital data to analog data for communication with the external modem. The digital signal processor processes the digital data and stores the processed data in the memory. The digital signal processor provides an interrupt to the external host processor to request that the host processor communicate data between memory and the host processor.

The memory may include a register for storing an interrupt clear signal indicative of the host processor completing the servicing of the interrupt. The analog interface and the digital signal processor may communicate data by storing the data in the memory. In response to an interrupt from the analog interface, the digital signal processor retrieves data stored in the memory by the analog interface.

The present invention provides a computer that includes a host processor, an analog interface, and a digital signal processor. The host processor is configured to execute signal processing at a first processing rate code for processing symbols including digital data indicative of a received analog signal. The analog interface communicates data with an external communication unit, such as a modem, and converts analog data received from external communication unit to digital data and converts digital data to analog data for communication with the external communication unit. Such conversion is performed at a sampling rate of the analog interface according to the present invention. The digital signal processor processes the digital data representative of the analog signal at a second data rate, such as the sampling rate of the analog interface. The host processor processes data at a symbol rate of the data according to the present invention. Such partition of the processing between the host processor and the digital signal processor allows the digital signal processor to process data at rates comparable to the sampling rate of the analog interface and in turn at the rate of received data. The host processor executes signal processing at slower rates, typically at the symbol rate of data that is to be communicated with the external communication unit.

The present invention further provides an interface circuit having a sleep mode for reduced power consumption. The interface circuit particularly includes a digital signal processor and an analog interface. The digital signal processor has a sleep mode in which the digital signal processor draws a sleep current and has an operational mode in which the digital signal processor draws an operational current that is greater than the sleep current. The digital signal processor enters the operational mode in response to a wake-up signal, and enters the sleep mode after a predetermined event while in the operational mode. The predetermined event may be, for example, a time interval during which no external signal is received. The analog interface receives a ring detect signal from a modem, for example, and provides a wake-up signal to the digital signal processor in response to the ring detect signal. The digital signal processor may then provide an interrupt to an external host processor to indicate that the digital signal processor is in an operational mode.

BRIEF DESCRIPTION OF THE DRAWINGS

FIG. 3 is a block diagram of the registers of a memory of the modem interface of FIG. 2.

DETAILED DESCRIPTION OF THE INVENTION

Figure 1:
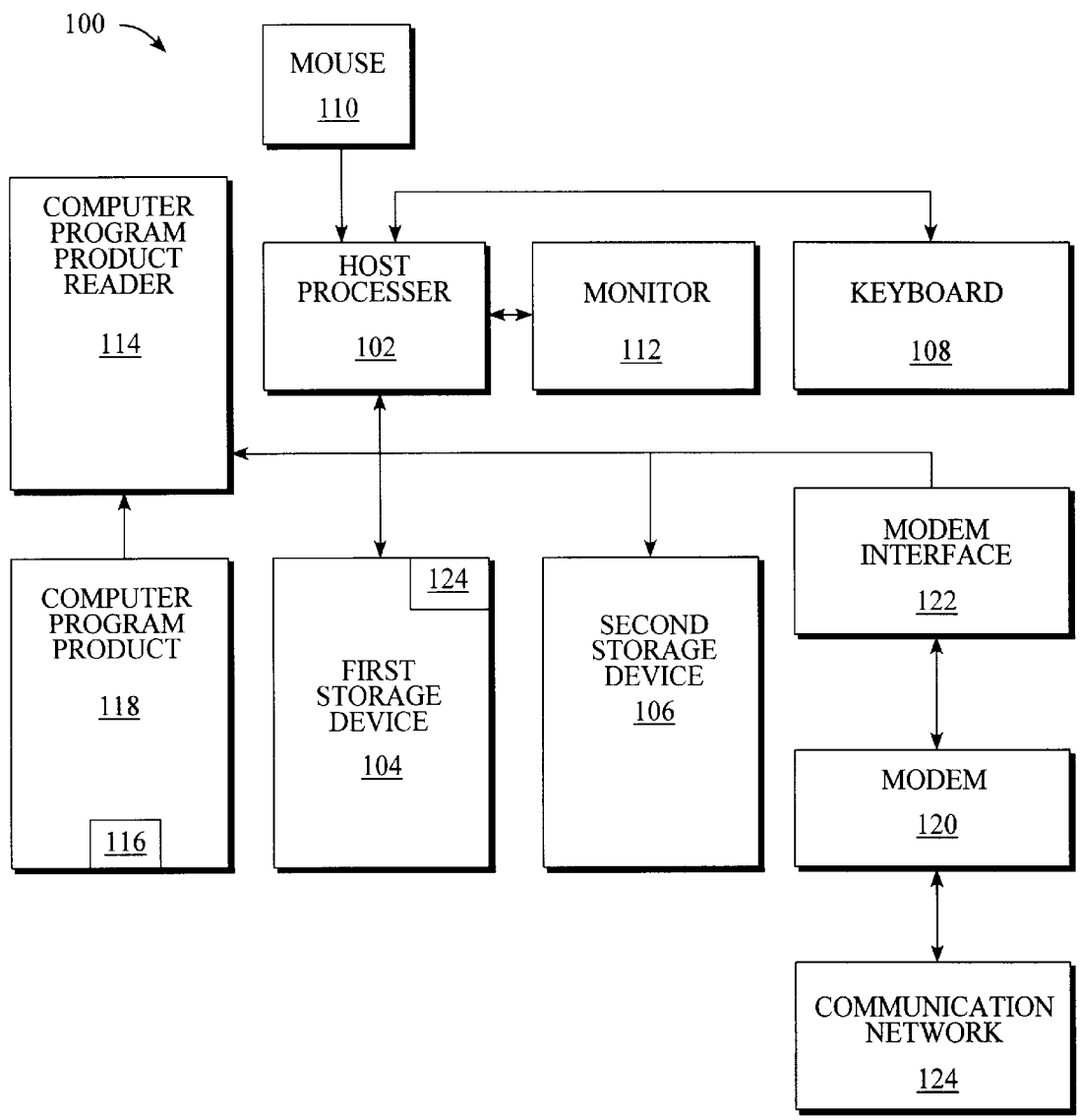
FIG. 1 is a block diagram of a computer in accordance with the present invention.

FIG. 1 is a block diagram of a computer 100 in accordance with the present invention. The computer 100 includes a host processor 102, a first storage device 104, a second storage device 106, a keyboard 108, a mouse 110, a monitor 112, a computer program product reader 114, a modem 120 and a modem interface 122. The host processor 102 is coupled to the first storage device, such as a memory, and is coupled to the second storage device 106, such as a disk storage system. In one embodiment of the present invention, the host processor 102 has a reduced instruction set (RISC) architecture. A user may interact with the computer 100 via a keyboard 108, the mouse 110, and the monitor 112.

The computer program product reader 114 may be coupled to the host processor 102 to allow computer readable program code devices 116, such as encoded bits of a computer program product 118, to be input to the host processor 102 and stored in the first or second storage devices 104, 106 for use in controlling the operation of the computer 100 when the computer program product 118 is inserted into a slot (not shown) of the computer program product reader 114. The computer program product reader 114 may be, for example, a memory hard drive, a floppy disk drive, or a CD ROM drive. The computer program product 118 may be, for example, a memory, hard disk, floppy disk, CD ROM, or other storage device. An operating system is loaded into the memory 104 or the disk storage 106 or a combination of the memory 104 and the disk storage 106 and instructs the host processor 102 to load and execute compilers and other applications. Many conventional compilers or other applications are distributed on computer program products 118 such as diskettes, storage devices such as ROMs, or storage devices such as disk storage systems. Each contains computer readable code devices which cause the computer 100 to operate in a particular manner when a copy of the code devices is loaded into the computer 100.

The modem interface 122 couples the modem 120 to the host processor 102. The modem interface 122 converts data between digital and analog forms and processes such data for communication between the computer 100 and the modem 122. The modem interface 122 provides an analog front end to the modem 122 and a digital interface to the host processor 102. In one embodiment of the present invention, the processing of the data communicated between the modem 122 and the host processor 102 is partitioned between the modem interface 122 and the host processor 102 so that the host processor 102 executes symbol rate processing and below, and the modem interface 122 executes signal processing occurring in analog and in digital at line sampling rates. The modem 120 is coupled to an external communication network 124, such as a public switch telephone network (PSTN), a local area network (LAN), or the like. The modem 122 may be a conventional voice-grade modem.

Data communication between the modem interface 122 and the host processor 102 is controlled by interrupts. Specifically, the modem interface 122 provides an interrupt to the host processor 102, which services the interrupt. In one embodiment of the present invention, the host processor 102 services the interrupt by exchanging batched real-time data with the modem interface 122. In one embodiment of the present invention, the modem interface 122 provides the interrupt to the host processor 102, at periodic intervals, for example, one or more symbol times in duration.

Figure 2:
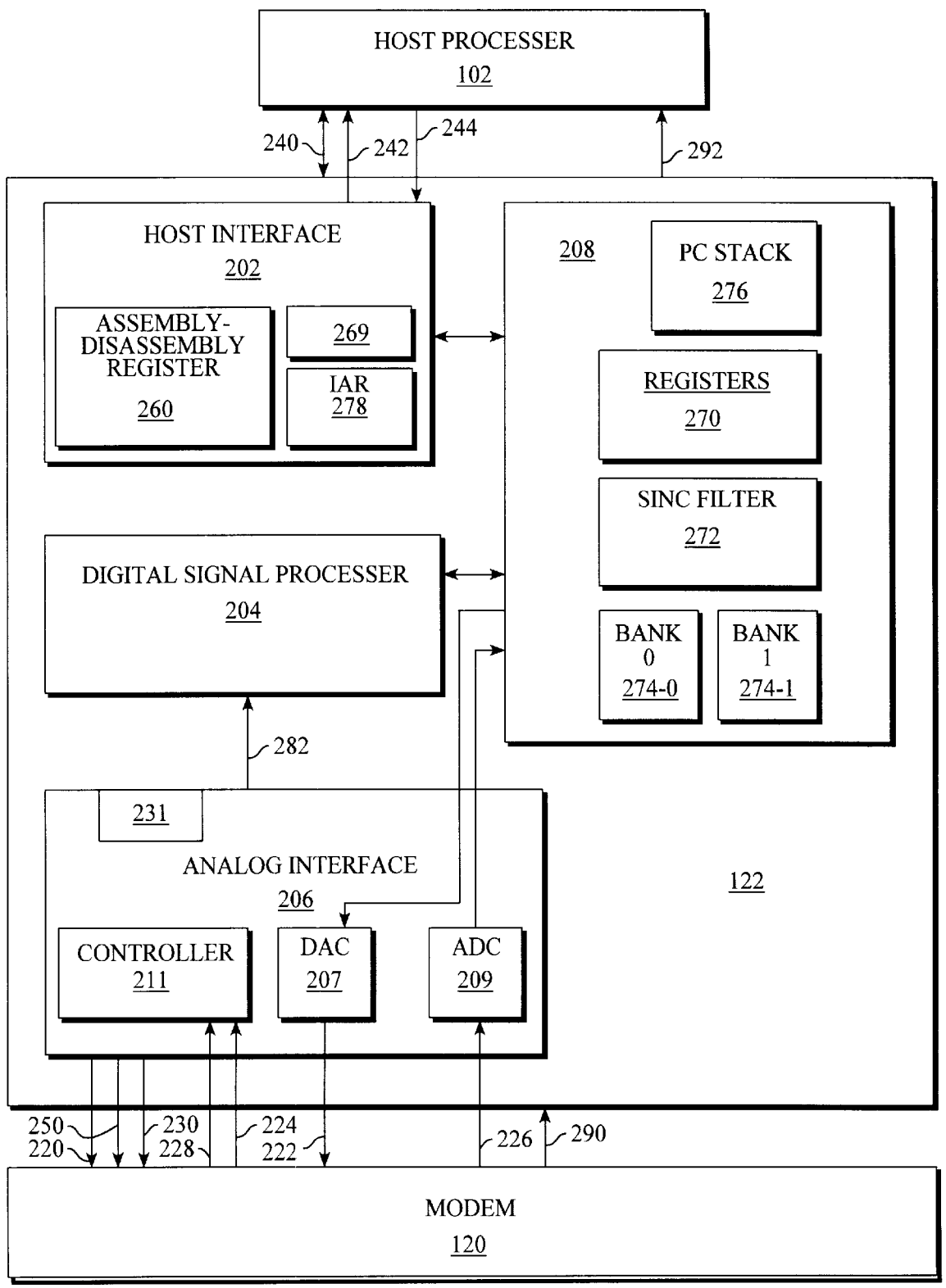
FIG. 2 is a block diagram of a modem interface of the computer of FIG. 1.

FIG. 2 is a block diagram of the modem interface 122, which includes a host interface 202, a digital signal processor 204, an analog interface 206, and a memory 208. As is well known, the modem 120 operates in a receive mode for receiving data from the external communication network 124 and operates in a transmit mode for providing data to the external communication network 124. In accordance with the present invention, the modem interface 122 correspondingly operates in both receive and transmit modes.

The analog interface 206 includes a digital-to-analog converter (DAC) 207, an analog-to-digital converter (ADC) 209, a controller 211, and a clock generator 213. The controller 211 provides a transmit indicator signal 220 to the modem 120 to indicate that the analog interface 206 is transmitting data to the modem 120. The transmit indicator signal 220 may be provided, for example, on a differential signal line. The DAC 207 applies a serial analog output signal 222 to the modem 120 for communicating data from the computer 100 to the modem 120. The controller 211 provides a transmit enable signal 230 to the modem 120 for frame synchronization of transmitted data. The controller 211 receives a receive indicator signal 224 from the modem 120 to indicate that data is being transmitted from the modem 120 to the analog interface 206 and receives a serial analog input signal 226 from the modem 120. The receive indicator signal 224 may be provided, for example, on a differential line. The modem 120 provides a receive enable signal 228 to the controller 211 for frame synchronization of the data received by the analog interface 206. The controller 211 provides a wait signal 250 to the modem 120 to suspend transmission of the date from the modem 120.

The host processor 102 and the modem interface 122 transfer data between each other over a databus 240. In one embodiment of the present invention, the modem interface 122 connects to the databus 240 as a direct memory access (DMA) device. To transfer such data, the host interface 202 provides a host interrupt 242 to the host processor 102.

The DAC 207 and the ADC 209 may be, for example, the sigma-delta converters manufactured by Cirrus Logic of Fremont, Calif. under Model Number CS 8399. The clock generator 213 generates clock signals for the DAC 207, the ADC 209, and the controller 211. In one embodiment of the present invention, the clock generator 213 generates the clock signals from an applied external reference frequency signal. In one embodiment of the present invention, the clock generator 213 generates a clock signal for use by the host processor 102 as a timing signal. The clock generator 213 also generates low-speed sampling clocks for the analog interface 206. In one embodiment of the present invention, the frequency of these low-speed sampling clocks is determined by a programmable divisor stored in the registers 270.

The host interface 202 includes an assembly-disassembly register 260 for converting data between different bus types. In one embodiment of the present invention, the host interface 202 uses an 8 bit wide bus, and the digital signal processor 204 and the analog interface 206 uses an internal 16 bit format. The assembly-disassembly register 260 converts the data between the different bus types. The host interface 202 also includes a control register 269 that has a control bit for determining whether the big or little endian convention is used for such conversion.

The memory 208 includes registers 270 for storing data transferred between the host processor 102 and the modem interface 122. The memory 208 is shared by the host processor 102 and the digital signal processor 204. In one embodiment of the present invention, the digital signal processor 204 has priority in case of contention between the host processor 102 and the digital signal processor 204. The modem interface 122 preferably is sufficiently fast to allow zero wait state operation on the data bus 240.

In one embodiment of the present invention, the memory 208 also includes a second order sinc filter 272 in the transmit path between the registers 270 and the DAC 207 for providing filtering of the data to be provided to the modem 120 by the modem interface 122. The memory 208 also includes first and second memory bank 274-0 and 274-1, respectively.

In one embodiment of the present invention, the memory 208 also includes a first order sinc filter (not shown) in the receive path between the registers 270 and the ADC 209 for providing filtering of the data to be received from the modem 120 by the modem interface 122. Such a sinc filter may eliminate one of the down sampling rates of the clock generator 213 to thereby simplify the processing program stored in the program memory 402 (described below in conjunction with FIG. 4) of the digital signal processor 204 and to reduce the throughput requirements of the digital signal processor 204. Such a sinc filter is implemented in substantial part in software, according to the present invention.

The analog interface 206 provides an interrupt 282 to the digital signal processor 204 to control the transfer of data between the analog interface 206 and the digital signal processor 204. In one embodiment of the present invention, the analog interface 206 generates the interrupts 282 at one half the sampling rate, and, for each interrupt 282, the digital signal processor 204 transfers two samples from the registers 270 in each direction (e.g., transmit and receive). These two samples are separated in time by one half of a low-speed sample interval determined by the sampling rate. Specifically, the digital signal processor 204 reads the ADC registers 314 and writes to the DAC registers 312 in response to the interrupt 282.

The memory 208 also includes a program counter (PC) stack 276 for storing the program counters of the instructions of the program executed by the digital signal processor 204. This allows the digital signal processor 204 to perform interrupt processing.

The host interface 202 includes an input/output address register (IAR) 278 that provides addressing of the memory 208 in input/output read and write operations. In one embodiment of the present invention, the input/output address register 278 is auto incrementing. In another embodiment of the present invention, the input/output address register 278 is non-incrementing.

The host processor 102 provides an address signal 244 to the host interface 202 for defining the addressing of the memory 208 and of the input/output address register 278. Specifically, the address signal 244 enables the host processor 102 to read and write to the input/output address register 278, and to select between the low and high bytes of the data word of the signal processor 122. In one embodiment of the present invention, the address signal 244 includes two address lines A0 and A1. In one embodiment of the present invention, the addressing is defined in Table 1.

TABLE I

| A1 | A0 | Target |
|----|----|--------|
| 0  | 0  | RAM, low byte |
| 0  | 1  | RAM, high byte |
| 1  | 0  | IAR, low byte |
| 1  | 1  | IAR, high byte |

According to one embodiment of the present invention, both the host processor 102 and the input/output address register 278 view the memory 208 in the same linear address space. In one embodiment of the present invention, different physical blocks of the memory 208 occupy the following ranges:

| Memory | Address Range |
|--------|---------------|
| Program RAM: | 0 to 400 |
| Data RAM Bank-0: | 4000 to 44FF |
| Data RAM Bank-1: | 8000 to 84FF |

The modem 120 provides a ring detect signal 290 to indicate that a communication is being received from the external communication network 124. In a communication network 124 that is a PSTN, the ring detect signal 290 is a conventional ring detect signal from a telephone call. The modem interface 122 provides a discrete output signal 292 to the host processor 102. In one embodiment of the present invention, the discrete output signal 292 is a power enable signal to the computer 100 which may be used, for example, in a sleep mode.

FIG. 3 is a block diagram of the registers 270, which include memory mapped registers 302. The memory mapped registers 302 includes a host interrupt register 310, first and second digital to analog converter (DAC-0, DAC-1, respectively) registers 312-1, 312-2, first and second analog to digital converter (ADC-0, ADC-1, respectively) registers 314-1 and 314-2, a sampling rate divisor register 316, a discrete input/output (I/O) register 318, a program counter register 320, a status register 322, and a host interrupt clear register 324.

To transfer data between the modem interface 122 and the host processor 102, the modem interface 122 generates an interrupt by writing to the host interrupt register 310. The host processor 102 services the interrupt by transferring data to or from the modem interface 122 by writing or reading from predefined locations of the first and second memory banks 274-0 and 274-1. The host processor 102 clears the interrupt by writing an interrupt clear to the host interrupt clear register 324.

The DAC registers 312-1 and 312-2 and the ADC registers 314-1 and 314-2 provide a data interface between the analog interface 206 and the digital signal processor 204 for respective transmission and reception of data from the digital signal processor 204.

The sampling rate divisor register 316 provides a programmable countdown divisor to a programmable countdown chain in the clock generator 213 of the analog interface 206 to produce low speed sampling clocks for the analog processor 206. The modem interface 122 uses the discrete I/O register 318 for controlling and sensing an external DAA (not shown).

The program counter register 320 is used for tracking the execution of the program by the digital signal processor 204. The status register 322 stores status of the execution of programs by the digital signal processor 204. The host processor 102 uses both the program counter register 320 and the status register 322 for controlling the starting and stopping of programs executed by the digital signal processor 204.

In one embodiment of the present invention, the memory mapped registers 302 are provided at the addresses shown in Table II.

TABLE II

| Register | Address |
|----------|---------|
| Host Interrupt Register 310 | 7F0 |
| DAC register-0 312-1 | 7F1 |
| DAC register-1 312-2 | 7F2 |
| ADC register-0 314-1 | 7F3 |
| ADC register-1 314-2 | 7F4 |
| Sampling rate divisor register 316 | 7F5 |
| Discrete I/0 register 318 | 7F6 |
| Program Counter 320 | 7F7 |
| Status register 322 | 7F8 |
| Host Interrupt Clear register 324 | 7FF |

Figure 4B:
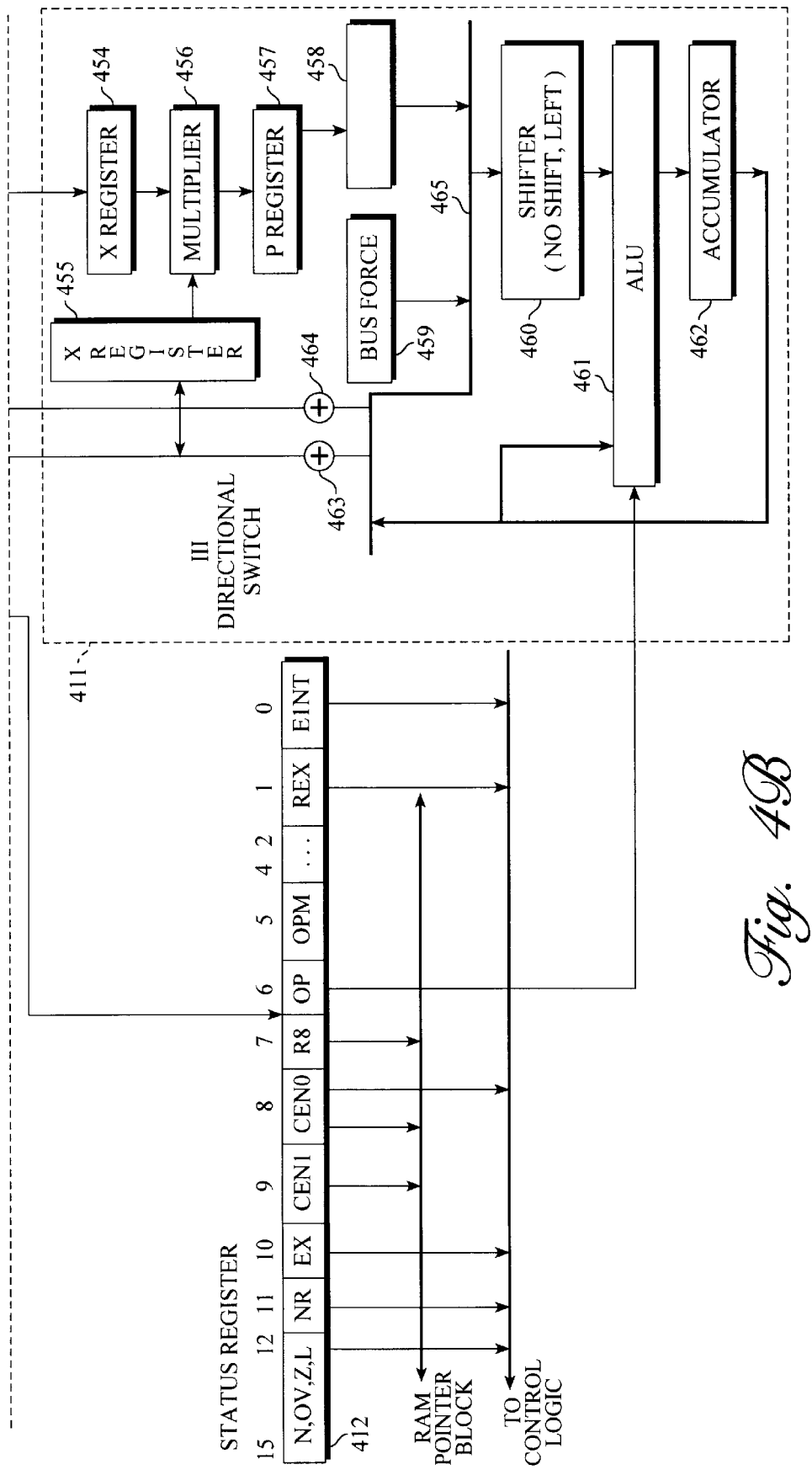
FIG. 4 is a block diagram of the digital signal processor of FIG. 2.

FIG. 4 is a block diagram of the digital signal processor 204 which includes a program memory 402, a sequencer 404, a loop counter register (LCT) 406, a memory pointer unit 408, general purpose registers 410, a status register 412, and an arithmetic unit 414. In one embodiment of the present invention, the digital signal processor 204 has a Harvard architecture with separate program and data memory spaces with independent buses.

The program memory 402 stores a plurality of programs, described below in conjunction with FIG. 6, that are executed by the digital signal processor 204. The host processor 102 applies a write enable signal 420 to the program memory 402 to enable writes to the program memory 402 for storing digital signal processing or filter processing code. The host processor 102 and the sequencer 404 each may apply a read enable signal 422 via a multiplexer 424 to enable reads from the program memory 402. An address bus 428 couples the host processor 102, the program memory 402 and the sequencer 404 through a multiplexer 430. A databus 240 couples the host processor 102, the program memory 402, and the sequencer 404 through a multiplexer 434 for communicating data. The sequencer 404, the LCT 406, the pointer 408, the general purpose registers 410, the status register 412, and the arithmetic unit 414 each are coupled to a first bus 440. A multiplexer 442 couples the first bus 440 to the second RAM bank 274-1. A bi-directional switch 444 couples the first bus 440 to a second bus 446. The second bus 446 is coupled to the first RAM bank 274-0, the arithmetic unit 414 and the second RAM bank 274-2 via a bi-directional switch 448.

The sequencer 404 includes a program counter 449 and an immediate data (IMM) register 450. Using the program counter 440 to determine the executed program instruction, the sequencer 404 reads instructions and data from the program memory 402 for controlling the operation of the digital signal processor 204. The sequencer 404 uses the contents of the IMM register 450 for addressing immediate data for processing, such as adding the immediate data to the contents of the accumulator (described below) in the arithmetic unit 414.

The loop counter register 406 stores the loop count to implement program loops without using an accumulator (described below) in the arithmetic unit 414 to decrement the loop count.

The pointer block 408 comprises a first and second pointer blocks 450-0 and 450-1. Both pointer blocks 450-0 and 450-1 are coupled to a multiplexer 451 which is coupled to the first memory bank 274-0. The pointer block 450-1 also is coupled to the second memory bank 274-1. The pointer blocks 450 track the location pointed to in the memory 208.

The general purpose registers 410 are used as a scratch pad by the digital signal processor 204. The status register 412 includes various status information including negative sign flag, overflow/parity flag, a zero flag, a link carry flag, a normalized flag, an accumulator extension, memory bank select, overflow protection, operation modes, shift specification of the multiplier, busy execution, and enable interrupt. The enable interrupt in the status register 412 is a conventional interrupt enable bit. The digital signal processor 204 accepts interrupts if the enable interrupt bit is set (e.g., bit=1). The enable interrupt bit is automatically reset (e.g., bit=0) when the interrupt signal is received. If an interrupt occurs when the enable interrupt bit is not set, the interrupt is held and is executed when the interrupt bit is set.

The arithmetic unit 414 executes arithmetic and logical operations on the data. The arithmetic unit 414 includes an X register 454, a Y register 455, a multiplier 456, a product register 457, a much less than one register 458, a bus force register 459, a shifter 460, an arithmetic logic unit (ALU) 461, an accumulator 462, and bi-directional switches 463 and 464. The X register 454 bi-directionally communicates data with the second bus 446, and provides data to the multiplier 456. The Y register 455 bi-directionally communicates data with the first data bus 440 and provides data to the multiplier 456. The multiplier 456 provides a multiplied output of the contents of the X register 454 and the Y register 455 applied to the multiplier 456 to the product register 457. The product register 457 applies its contents to the much less than one (<<) register 458 which is coupled to the third bus 465. The bi-directional switches 463 and 464 couple respective first and second buses 440 and 446 to the third bus 465. The shifter 460 receives data from the third bus 465 and provides shifted data to the arithmetic logic unit 461. Data is applied from the third bus 465 to an input of the arithmetic logic unit 461 which performs operations on the data in response to an operation flag from the status register 412. The data from the arithmetic logic unit may be provided to the accumulator 462 or to the third bus 465 for processing.

Figure 5:
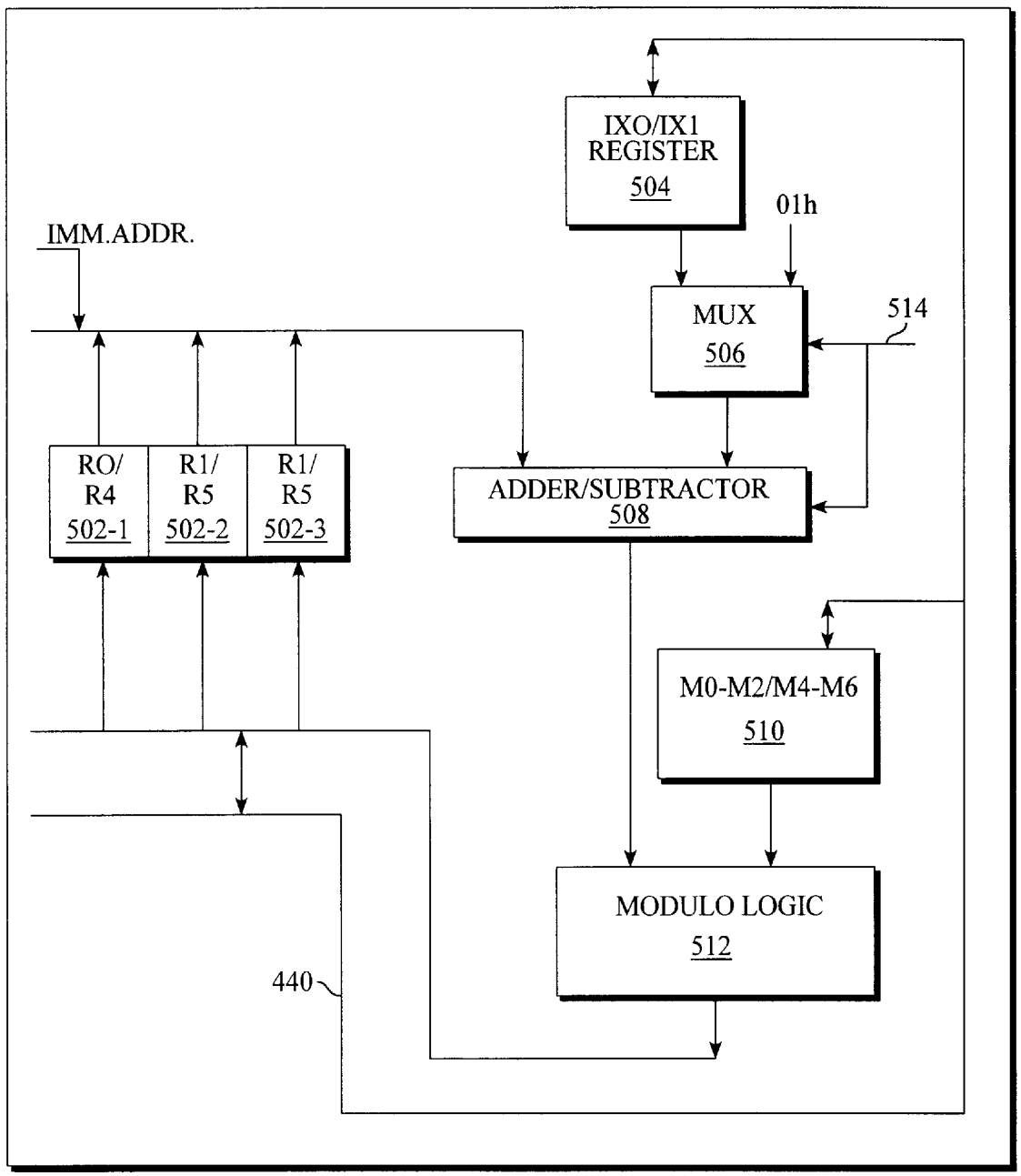
FIG. 5 is a block diagram of the memory pointers of the digital signal processor of FIG. 4.

FIG. 5 is a block diagram of the memory pointer unit 408 in accordance with the present invention. The memory pointer unit 408 includes a plurality of memory pointer registers 502-1 through 502-3, an index register 504, a multiplexer 506, an adder 508, a modulo circular buffer length register 510, and a modulo logic circuit 512. The memory pointer registers 502 are coupled to the first data bus 440 for receiving address information from the bus 440. The adder 508 receives the instructions from the memory pointer registers 502 and the IMM register 450 of the sequencer 404. The first data bus 440 also applies an index to the index register 504 and the modulo circular buffer length registers 510. The index specifies the value by which the memory pointer is modified, for example, by addition or subtraction to the contents of the memory pointer registers 502. The index from the index register 504 is applied to a first input of the multiplexer, and a unit index is applied to a second input of the multiplexer 506. In one embodiment of the present invention, the unit index has a value 01 hexadecimal. A modulo select signal 514 is applied to the multiplexer 506 and to the adder 508 for control thereof. The output of the multiplexer 506 is applied to a second input of the adder 508. The adder 508 adds or subtracts the inputs from the multiplexer 506 and either the memory pointer registers 502 or the immediate address from the IMM register 450. The adder 508 applies the sum to a first input of the modulo logic circuit 512. The modulo circular buffer length register 510 applies the address to a second input of the modulo logic circuit 512, which provides the modulo addition of the two signals to the data bus 440 and to the memory pointer registers 502 to form a pointer to the memory 208.

Figure 6:
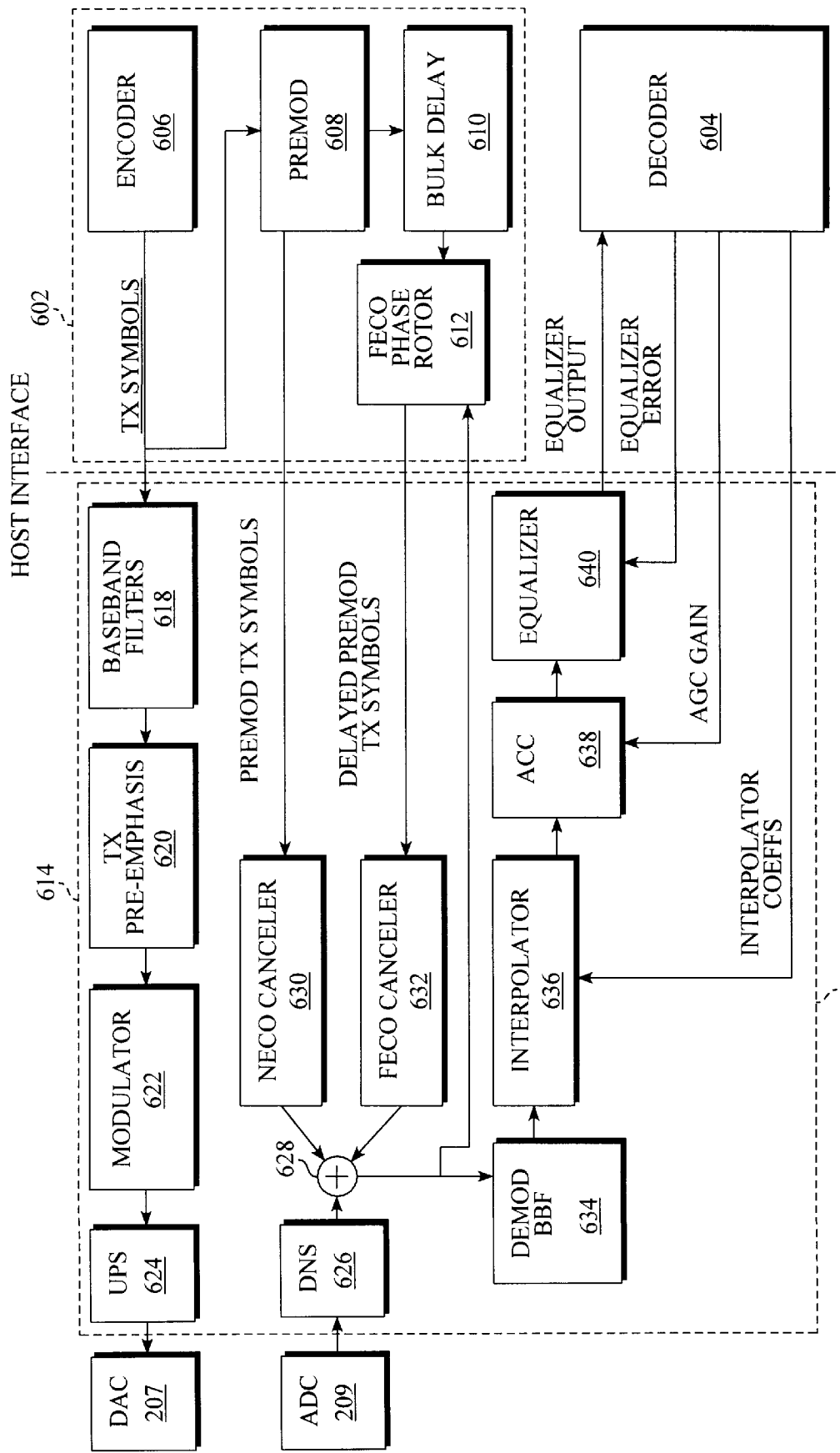
FIG. 6 is a block diagram of software modules in the memory of the modem interface of FIG. 2 and the memory of the computer of FIG. 1.

FIG. 6 is a block diagram of software modules stored in the program memory 402 and the memory 204. The task distribution of these software modules between the host processor 102 and the modem interface 122 is divided, according to the present invention, primarily by the processing speed required by the data. Specifically, the host processor 102 executes symbol rate processing and below. The modem interface 122 executes the signal processing occurring in analog and in digital at line sampling rates.

The memory 204 comprises a communication module 602 and a decoding module 604 in one embodiment of the present invention. The communication module 602 includes an encoder 606, a premodulator 608, a bulk delay circuit 610, and a forward echo (FECO) phase rotator 612. The program memory 402 comprises a transmit module 614 and a receive module 616. The transmit module 614 processes data for communication with the digital-to-analog converter 207 for transmission by the modem 120. The receive module 616 receives data for processing from the modem 120 via the analog-to-digital converter 209.

The transmit module 614 includes base band filters 618, transmit (TX) pre-emphasis 620, a modulator 622, and an up-sampler (UPS) 624. In the host processor 102, the encoder 606 provides transmit symbols to the base band filters 618 and to the premodulator 608 in response to data applied to an input of the encoder 606 from the memory 204. The transmit signals include the data that is to be transmitted from the modem interface 122 via the modem 120 to the external communication network 124. The base band filters 618 filter the transmit symbols which are applied to the transmit pre-emphasis 620. The modulator 622 modulates the pre-emphasized transmit signal which is applied to the up-sampler 624. The up-sampled output signal from the up-sampler 624 is provided to the digital to analog converter 207 for converting the digital up-sampled signal into the serial analog output signal 222 for transmission to the modem 120.

The receive module 616 includes a down-sampler (DNS) 626, a summer 628, a near echo (NECO) canceller 630, a far echo (FECO) canceller 632, a demodulator base band filter 634, an interpolator 636, an automatic gain controller (AGC) 638, and an equalizer 640. In the receive mode, the serial analog input signal 226 from the modem 120 is applied to the analog to digital converter (ADC) 209 which converts the serial analog input signal 226 into a digital signal which is applied to the down sampler 626. The output of the down sampler 626 is applied to the summing circuit 628. The pre-modulator 608 provides pre-modulated transmit symbols to the NECO canceller 630 whose output is provided to the summing circuit 628. The pre-modulator 608 also provides pre-modulated transmit symbols to the bulk delay circuit 610 which provides a delayed signal to the FECO phase rotator 612 which provides delayed pre-modulated transmit symbols to the FECO canceller 632. The modified signal from the FECO canceller 632 is applied to the summing circuit 628 which provides an echo canceller error signal to both the FECO phase rotator 612 and the demodulator base band filter 634. The filtered signal is applied to the interpolator 636 which provides an interpolated signal to the AGC 638 in response to interpolator coefficients from the decoder 604. The automatic gain control (AGC) circuit 636 provides AGC gain control to the interpolated signal in response to the AGC gain signals from the decoder 636. The gain controlled signal is applied to an input of the equalizer 640 which provides an equalized output signal to the decoder 604 in response to an equalizer error signal from the decoder 604 and the gain controlled signal.

Figure 7:
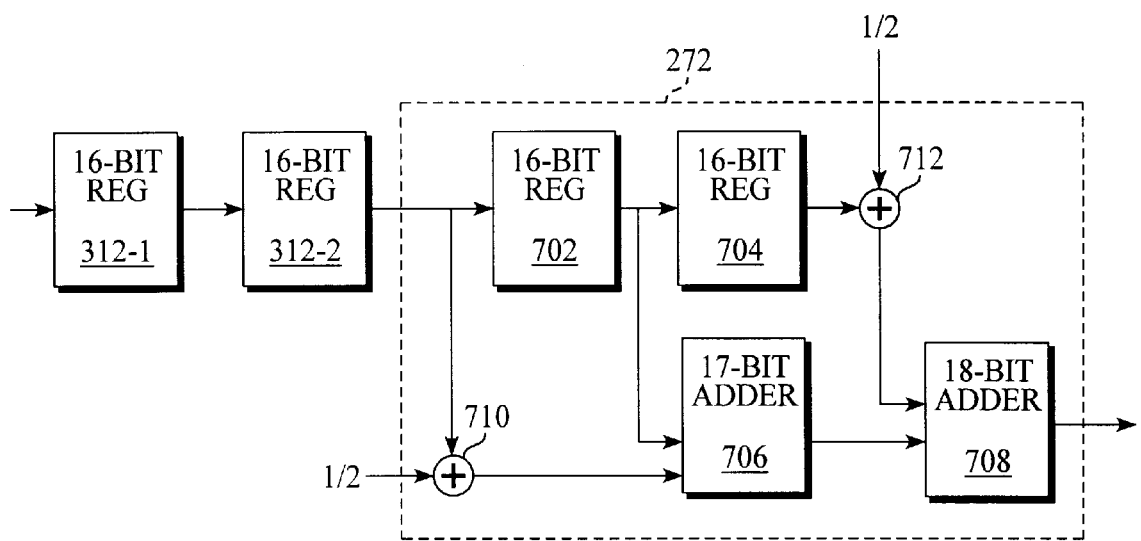
FIG. 7 is a block diagram of a second order sinc filter.

FIG. 7 is a block diagram of the second order sinc filter 272 in accordance with the present invention. In one embodiment of the present invention, the second order sinc filter 272 is provided in the transmit path between the memory 208 and the DAC 207 to eliminate one of the time sampling rates from the clock generator 213. Such a filter 272 simplifies the program stored in the program memory 402 and thereby reduces the throughput requirements of the digital signal processor 204. The second order sinc filter 700 includes registers 702 and 704, adders 706 and 708, and multipliers 710 and 712. The DAC registers 312-1 and 312-2 are coupled in a cascade configuration to both the register 702 and the multiplier 710. Both the host processor 102 and the digital signal processor 204 store, in the DAC registers 312-1 and 312-2, data that is to be transmitted by the analog interface 206 to the modem 120. In one embodiment of the present invention, the DAC registers 312 are 16 bit registers. The DAC register 312-2 provides data to both the register 702 and the multiplier 710. A one-half frequency clock signal from the clock generator 213 is applied to the multiplier 710, which provides down sampled data to the adder 706. The register 702 provides an output signal to both the register 704 and the adder 706. In one embodiment of the present invention, the registers 702 and 704 are 16 bit registers. The adder 706 adds the data from the register 702 and the down sampled data and provides the sum to the adder 708. In one embodiment of the present invention, the adder 708 is a 17 bit adder. The register 704 provides data to the multiplier 712. In response to the applied data and to a one-half frequency clock signal from the clock generator 213, the multiplier 712 provides down sampled data to the adder 708, which adds the down sampled data and the sum data from the adder 706 to generate filtered data for transmission to the DAC 207 of the analog interface 206. In one embodiment of the present invention, the adder 708 is an 18 bit adder.

Figure 8:
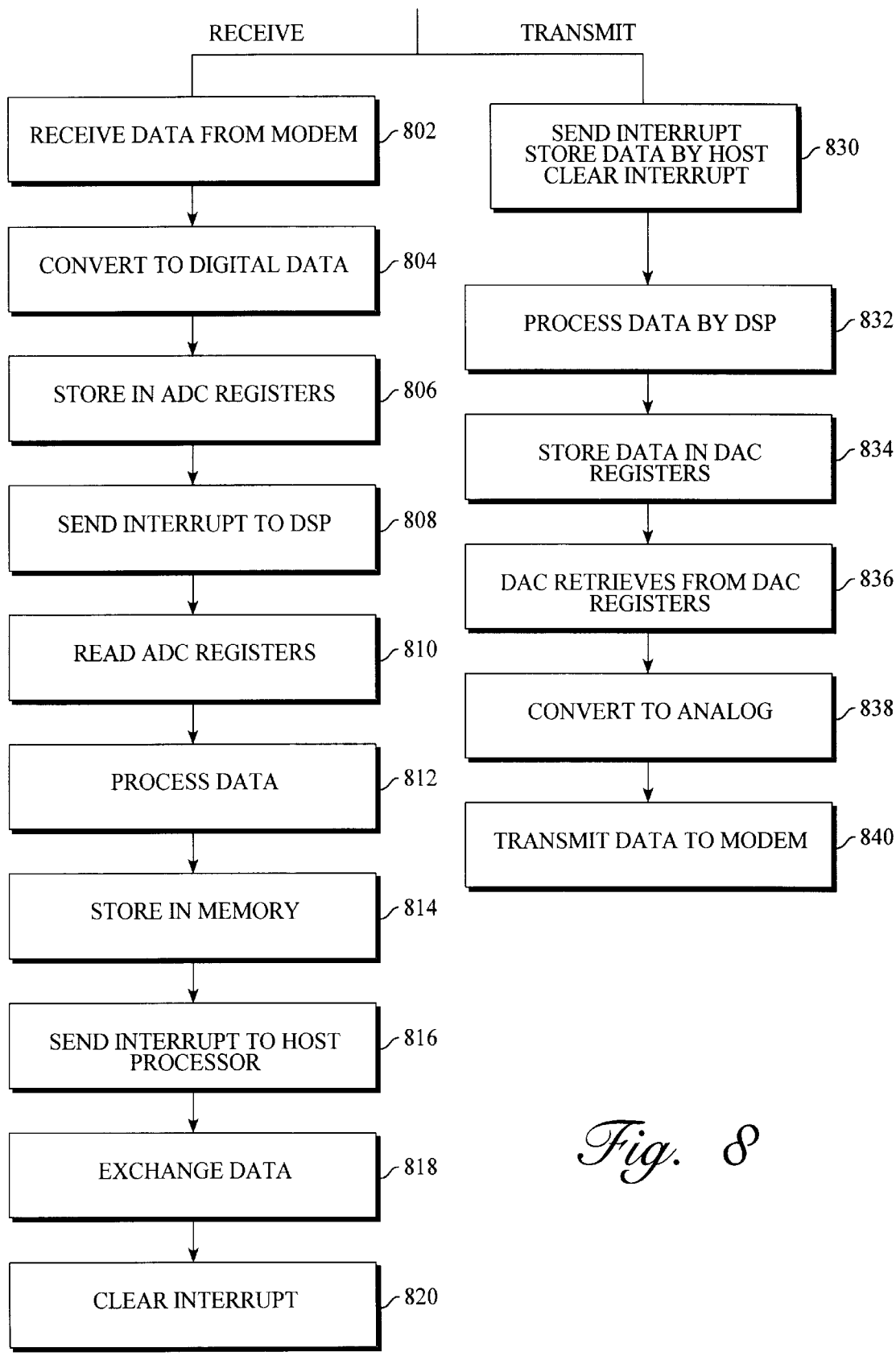
FIG. 8 is a flow chart illustrating the operation of the modem interface of FIG. 2, according to an embodiment of the present invention.

FIG. 8 is a flow chart illustrating the operation of the modem interface 122 in accordance with the present invention. In a receive mode, the analog interface 206 receives 802 data from the modem 120. The analog to digital converter 209 converts 804 the data into digital data and stores 806 the digital data in the ADC registers 314-1 and 314-2. At periodic intervals, the controller 211 sends 808 an interrupt 282 to the digital signal processor 204. In response to the interrupt 282, the digital signal processor 204 reads 810 the ADC registers 314-1 and 314-2. As described above, in accordance with one embodiment of the present invention, the controller 211 sends the interrupt 282 every two samples. The digital signal processor 204 processes 812 the data in accordance with the program stored in the program memory 402. Such processing may include, for example, the receive module 616. Such processing may be, for example, at rates near the sampling rates of the ADC 209. The digital signal processor 204 stores 814 the processed data in the memory 208. During the processing of the data, the digital signal processor 204 also stores the program counter in the program stack 276 and the status in the status register 412 in the status register 322. Periodically, the digital signal processor 204 sends 816 an interrupt to the host processor 102 by storing an interrupt in the host interrupt register 312. The host processor 102 in the digital signal processor 204 exchange 818 data between each other by storing the data in the memory 208. After the host processor 102 and the digital signal processor 204 exchange data, the host processor 102 clears 820 the interrupt by storing an interrupt clear signal in the host interrupt clear register 324. Processing by the host processor 102 may be, for example, at symbol rates. The received process is repeated as data is received from the modem.

In a transmit mode, the digital signal processor 204 sends 830 an interrupt to the host processor 102 in a manner similar to that described above for step 816. The host processor 102 stores data in the memory 208 and clears the interrupt as described above in step 820. The processing by the host processor 102 may be, for example, at symbol rates. The digital signal processor 204 processes 832 the data and stores 834 the processed data in the DAC registers 312-1 and 312-2. Such processing may include, for example, the transmit module 614. The digital to analog converter 207 retrieves 836 the data from the DAC registers 312-1 and 312-2 and converts 838 the data to an analog signal. The analog interface 206 transmits 840 the analog signal to the modem 120 for transmission to the external communication network 124.

Figure 9:
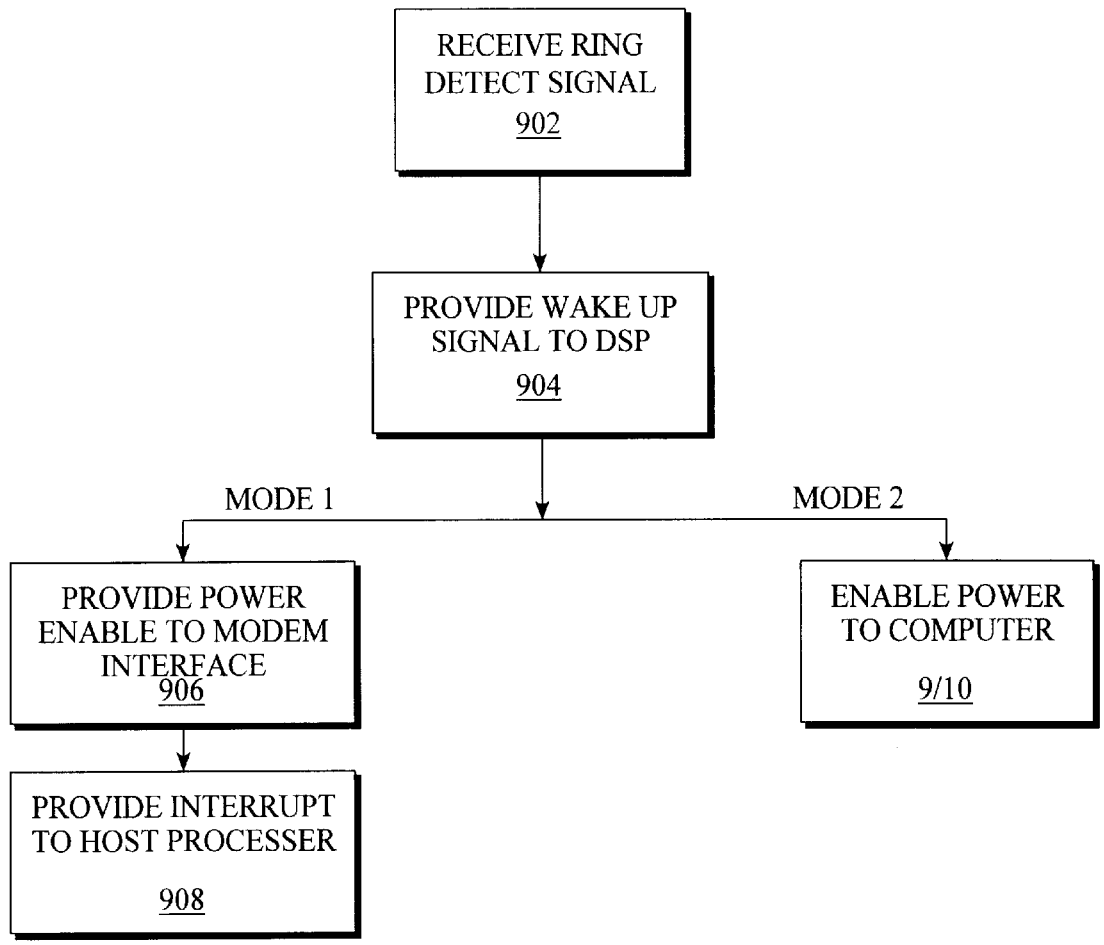
FIG. 9 is a flow chart illustrating the operation of a sleep mode of the modem interface of FIG. 2, according to an embodiment of the present invention.

FIG. 9 is a flow chart illustrating the operation of a sleep mode of the modem interface 122 in accordance with the present invention. In the sleep mode, the modem interface 122 consumes less power. Specifically, during periods in which the modem interface 122 is not communicating data through the modem 120, the modem interface 122 turns off, or places in a standby mode those elements of the modem interface 122 that are not used in a wake-up procedure. In particular, in the wake-up procedure, the analog interface 206 detects 902 a ring detect signal 290 from the modem 120 and sends 904 a wake-up signal to the digital signal processor 204. In one embodiment of the present invention (shown as Mode 1 in FIG. 9), the digital signal processor 204 wakes up 906 the remainder of the modem interface 122 and commands the host interface 202 to provide 908 an interrupt, defined above, to the host processor 102. In another embodiment of the present invention (shown as Mode 2 in FIG. 9), the digital signal processor 204 turns on 910 power to the rest of the computer 100 via a discrete output signal 292. In another embodiment of the present invention, the host processor 102 controls power and sleep control, and the modem interface 122 passes the ring detect signal 290 to the host processor 102.

What is claimed is:

1. A modem interface unit for coupling a communications modem to a host processor, such modem interface unit comprising:

a memory located in the modem interface unit for storing digital modem signals to be supplied to or received from a host processor;

a digital signal processor located in the modem interface unit and coupled to the memory for performing signal processing operations on incoming and outgoing digital modem signals;

a digital-to-analog converter located in the modem interface unit and coupled to the digital signal processor for receiving outgoing digital modem signals from the digital signal processor, converting them to analog signals and supplying the analog signals to a communications modem;

and an analog-to-digital converter located in the modem interface unit and coupled to the digital data processor for receiving incoming analog modem signals from the communications modem, converting them to digital signals and supplying the digital signals to the digital signal processor.

2. A modem interface unit in accordance with claim 1 wherein the signal processing operations performed by the digital signal processor are filtering operations.

3. A modem interface unit for coupling a communications modem to a host processor, such modem interface unit comprising:

a memory located in the modem interface unit for storing digital modem signals;

input circuitry located in the modem interface unit for receiving outgoing digital modem signals from a host processor and storing such signals in the memory;

a digital signal processor located in the modem interface unit and coupled to the memory for performing signal processing operations on digital modem signals;

interrupt circuitry located in the modem interface unit for receiving an interrupt signal from the host processor and supplying same to the digital signal processor for causing the digital signal processor to read stored outgoing digital modem signals from the memory and performing signal processing operations thereon;

and a digital-to-analog converter located in the modem interface unit and coupled to the digital signal processor for receiving outgoing digital modem signals from the digital signal processor, converting them to analog signals and supplying the analog signals to a communications modem.

4. A modem interface unit in accordance with claim 3 wherein the signal processing operations performed by the digital signal processor are filtering operations.

5. A modem interface unit for coupling a communications modem to a host processor, such modem interface unit comprising:

a digital signal processor located in the modem interface unit for performing signal processing operations on digital modem signals;

an analog-to-digital converter located in the modem interface unit for receiving incoming analog modem signals from a communications modem, converting them to digital modem signals and supplying the digital modem signals to the digital signal processor for processing by such processor;

a memory located in the modem interface unit for storing digital modem signals;

circuitry coupled to the digital signal processor for storing the processed digital modem signals in the memory;

output circuitry located in the modem interface unit and coupled to the memory for enabling a host processor to read processed digital modem signals stored in the memory;

and interrupt circuitry located in the modem interface unit and coupled to the digital signal processor for sending an interrupt signal to a host processor for causing the host processor to read processed digital modem signals stored in the memory.

6. A modem interface unit in accordance with claim 5 wherein the signal processing operations performed by the digital signal processor are filtering operations.

* * * * *